United States Patent
Molnar, Jr. et al.

(10) Patent No.: US 11,725,520 B2
(45) Date of Patent: Aug. 15, 2023

(54) FAN ROTOR FOR AIRFOIL DAMPING

(71) Applicant: Rolls-Royce Corporation, Indianapolis, IN (US)

(72) Inventors: Daniel E. Molnar, Jr., Lebanon, IN (US); Christopher D. Hall, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/518,897

(22) Filed: Nov. 4, 2021

(65) Prior Publication Data
US 2023/0134727 A1 May 4, 2023

(51) Int. Cl.
*F01D 5/16* (2006.01)
*F01D 5/14* (2006.01)

(52) U.S. Cl.
CPC .............. *F01D 5/16* (2013.01); *F01D 5/147* (2013.01); *F05D 2220/32* (2013.01); *F05D 2230/60* (2013.01); *F05D 2240/30* (2013.01); *F05D 2260/96* (2013.01)

(58) Field of Classification Search
CPC ... F01D 5/16; F01D 5/18; F01D 5/027; F01D 5/10; F01D 5/147; F01D 25/06; F01D 5/141; F01D 5/20; F01D 5/282; F01D 5/34; F05D 2260/96; F05D 2220/32; F05D 2260/961; F05D 2230/10; F05D 2240/30; F05D 2240/307; F05D 2220/36; F05D 2230/60; Y10S 416/50; F04D 29/324; F04D 29/668; F04D 29/666; F04D 29/388; F04D 29/30
See application file for complete search history.

(56) References Cited

U.S. PATENT DOCUMENTS

| | | | |
|---|---|---|---|
| 4,118,147 | A | 10/1978 | Ellis |
| 4,460,314 | A | 7/1984 | Fuller |
| 5,498,137 | A | 3/1996 | El Aini et al. |
| 5,820,348 | A | 10/1998 | Fricke |
| 6,042,338 | A | 3/2000 | Brafford et al. |
| 7,347,664 | B2 | 3/2008 | Kayser et al. |
| 8,061,997 | B2 | 11/2011 | Le Hong et al. |
| 8,171,632 | B2 | 5/2012 | Kuehhorn et al. |
| 8,186,057 | B2 * | 5/2012 | Harrison ............ F01D 5/027 29/889 |
| 9,334,740 | B2 | 5/2016 | Kellerer et al. |
| 9,879,551 | B2 | 1/2018 | Blaney et al. |
| 10,633,983 | B2 | 4/2020 | Barua et al. |
| 10,823,203 | B2 | 11/2020 | Theratil et al. |
| 10,938,328 | B2 | 3/2021 | Sellinger et al. |
| 2002/0067991 | A1 | 6/2002 | Montgomery et al. |
| 2009/0016894 | A1 | 1/2009 | Strother |
| 2017/0058680 | A1 | 3/2017 | Chouhan et al. |
| 2017/0211391 | A1 | 7/2017 | Wygant |
| 2018/0340425 | A1 * | 11/2018 | Malmborg ............ F01D 5/18 |

(Continued)

FOREIGN PATENT DOCUMENTS

WO   2002084114   10/2002

*Primary Examiner* — Eric J Zamora Alvarez
(74) *Attorney, Agent, or Firm* — Barnes & Thornburg LLP

(57) ABSTRACT

An airfoil for use in a gas turbine engine is formed to define cavities formed in the airfoil and a passage that extends between and fluidly interconnects the cavities. The airfoil further includes damping fluid located in the cavities and the damping fluid is adapted to flow between the cavities via the passage.

15 Claims, 11 Drawing Sheets

(56) References Cited

U.S. PATENT DOCUMENTS

| | | |
|---|---|---|
| 2020/0256198 A1 | 8/2020 | Akturk et al. |
| 2020/0340364 A1 | 10/2020 | Starr et al. |
| 2021/0062658 A1 | 3/2021 | Place et al. |
| 2021/0123347 A1 | 4/2021 | Molnar, Jr. |

* cited by examiner

FAN ROTOR FOR AIRFOIL DAMPING

FIELD OF THE DISCLOSURE

The present disclosure relates generally to gas turbine engines, and more specifically to rotors having airfoils for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted by rows of rotating blades and non-rotating vanes to drive the compressor and, sometimes, an output shaft. Each blade and vane has an airfoil that interacts with gases as they pass through the engine.

Airfoils have natural vibration modes of increasing frequency and complexity of the mode shape. The simplest and lowest frequency modes are typically considered to be the bending modes and the torsion mode. The first bending mode is a motion normal to the working surface of an airfoil in which the entire space of the airfoil moves in the same direction. Subsequent bending modes are similar to the initial bending modes, but with a node line of zero motion somewhere along the span of the airfoil other than the root, so that the upper and lower portions of the airfoil may move in opposite directions. The first torsion mode is a twisting motion around an axis that is parallel to the span of the airfoil, in which the entire space of the airfoil, on either side of the axis moves in the same direction.

Blades may be subject to destructive vibrations induced by steady or unsteady interaction of the airfoils of those blades with gases passing through a gas turbine engine. One type of vibration is flutter, which is an aero-elastic instability resulting from interaction of the flow over the airfoils of the blades and the blades' natural vibration tendencies. The lowest frequency vibration modes, i.e., the first bending mode and the first torsion mode, are often the vibration modes that are susceptible to flutter. When flutter occurs, the unsteady aerodynamic forces on the blade, due to its vibration and insufficient mechanical or aerodynamic damping, add energy to the vibration, causing the vibration amplitude to increase. The vibration amplitude can become large enough to cause damage to a blade. Another type of vibration is known as forced response, which is an aero-elastic response to inlet distortion or wakes from upstream airfoils, struts, or any other flow obstruction. The operable range, in terms of pressure rise and flow rate, of turbomachinery can sometimes be restructured by flutter and forced response phenomena.

The specific susceptibility of a blade to flutter may be increased if all the blades on a rotor are identical in terms of their vibration natural frequencies. Sometimes, intentional variations may be introduced into blades during manufacturing to create structural mistuning of a rotor and provided flutter resistance.

SUMMARY

The present disclosure may comprise one or more of the following features and combinations thereof.

An airfoil for use in a gas turbine engine according to the present disclosure includes an airfoil body and at least one passageway. The airfoil body extends radially outwardly relative to an axis and is configured to interact with gases surrounding the airfoil body, the airfoil body having a leading edge, a trailing edge opposite the leading edge, a pressure side, and a suction side opposite the pressure side. The airfoil body is formed to define a first cavity within the airfoil body and a second cavity within the airfoil body, the second cavity being spaced apart from the first cavity. The airfoil body includes a damping fluid disposed within at least one of the first cavity and the second cavity.

In some embodiments, the at least one passageway extends between and fluidly interconnecting the first cavity and the second cavity. The at least one passageway is sized to allow the damping fluid to move at least partially from one of (i) the first cavity to the second cavity and (ii) the second cavity to the first cavity in response to the airfoil experiencing a modal response during use of the airfoil so as to damp the airfoil and attenuate the modal response.

In some embodiments, at least one of (i) the at least one passageway is sized such that a rate of fluid transfer at which the damping fluid moves between the first cavity and the second cavity at least one of changes a frequency of the modal response of the airfoil and adds damping and (ii) the damping fluid viscosity causes a rate of fluid transfer at which the damping fluid moves between the first cavity and the second cavity to at least one of change a frequency of the modal response of the airfoil and add damping.

In some embodiments, the first cavity includes a first passageway sidewall through which the at least one passageway opens into the first cavity. The second cavity includes a second passageway sidewall through which the at least one passageway opens into the second cavity. The first passageway sidewall is spaced apart from the second passageway sidewall such that at least a portion of the airfoil body is disposed between the first passageway sidewall and the second passageway sidewall.

In some embodiments, the airfoil body includes a blade root located adjacent to the wheel and a blade tip spaced apart radially outward from the blade root. The first cavity is located radially outward of the second cavity and adjacent to the blade tip. The at least one passageway extends in a direction from the blade root to the blade tip.

In some embodiments, the at least one passageway includes a first passageway and a second passageway spaced apart from the first passageway in an axial direction.

In some embodiments, the airfoil body defines a camber line extending from the leading edge to the trailing edge. Each of the first passageway and the second passageway defines a center extending along a longitudinal extent of the passageway. The center of each of the first passageway and the second passageway intersects with the camber line of the airfoil body.

In some embodiments, the first cavity is located adjacent to the leading edge and the second cavity is located adjacent to the trailing edge such that the first cavity is spaced apart from the second cavity in the direction from the leading edge to the trailing edge.

In some embodiments, the at least one passageway extends in a direction from the leading edge to the trailing edge.

In some embodiments, at least one partial support wall is arranged within the first cavity and at least one partial support wall is arranged within the second cavity. Each partial support wall extends at least partially from a first sidewall of a respective cavity to a second sidewall of the respective cavity opposite the first sidewall.

In some embodiments, each partial support wall extends entirely from the first sidewall of the respective cavity to the second sidewall of the respective cavity. Each partial support wall includes at least one opening through which fluid is adapted to move throughout the respective cavity.

In some embodiments, the first cavity and the second cavity are arranged radially outwardly of a halfway point of a radial extent of the airfoil body.

In some embodiments, the airfoil body defines a camber line extending from the leading edge to the trailing edge. The first cavity and the second cavity are arranged on opposing sides of the camber line. The at least one passageway extends between the first cavity and the second cavity so as to intersect the camber line.

A rotor assembly for use in a gas turbine engine according to another aspect of the present disclosure includes a wheel arranged circumferentially about an axis and a first airfoil extending radially outwardly from the wheel relative to the axis and configured to interact with gases surrounding the first airfoil. The first airfoil includes a first airfoil body and at least one first passageway, the first airfoil body having a leading edge, a trailing edge opposite the leading edge, a pressure side, and a suction side opposite the pressure side, the first airfoil body formed to define a first cavity within the first airfoil body and a second cavity within the first airfoil body, the second cavity being radially spaced apart from the first cavity. The first airfoil body includes a first damping fluid disposed within at least one of the first cavity and the second cavity.

In some embodiments, the at least one first passageway extends between and fluidly interconnecting the first cavity and the second cavity. The at least one passageway sized to allow the first damping fluid to move at least partially from one of (i) the first cavity to the second cavity and (ii) the second cavity to the first cavity in response to the first airfoil experiencing a modal response during use of the first airfoil so as to damp the first airfoil and attenuate the modal response.

In some embodiments, the rotor further includes a second airfoil circumferentially offset from the first airfoil relative to the wheel, the second airfoil extending radially outwardly from the wheel relative to the axis and configured to interact with gases surrounding the second airfoil. In some embodiments, the second airfoil includes a second airfoil body and at least one second passageway.

In some embodiments, the second airfoil body includes a leading edge, a trailing edge opposite the leading edge, a pressure side, and a suction side opposite the pressure side. The second airfoil body is formed to define a third cavity within the second airfoil body and a fourth cavity within the second airfoil body, the third cavity being axially spaced apart from the third cavity. The second airfoil body includes a second damping fluid disposed within at least one of the third cavity and the fourth cavity.

In some embodiments, the at least one second passageway extends between and fluidly interconnecting the third cavity and the fourth cavity. The at least one second passageway is sized to allow the second damping fluid to move at least partially from one of (i) the third cavity to the fourth cavity and (ii) the fourth cavity to the third cavity in response to the second airfoil experiencing a modal response during use of the second airfoil so as to damp the second airfoil and attenuate the modal response.

In some embodiments, the first airfoil includes a blade root located adjacent to the wheel and a blade tip spaced apart radially outward from the blade root. The first cavity is located radially outward of the second cavity and adjacent to the blade tip. The at least one first passageway of the first airfoil extends in a direction from the blade root to the blade tip. The third cavity of the second airfoil is located adjacent to the leading edge and the fourth cavity is located adjacent to the trailing edge. The at least one second passageway of the second airfoil extends in a direction from the leading edge to the trailing edge.

In some embodiments, at least one of (i) the at least one passageway is sized such that a rate of fluid transfer at which the damping fluid moves between the first cavity and the second cavity at least one of changes a frequency of the modal response of the first airfoil and adds damping and (ii) the damping fluid viscosity causes a rate of fluid transfer at which the damping fluid moves between the first cavity and the second cavity to at least one of change a frequency of the modal response of the first airfoil and add damping.

In some embodiments, at least one partial support wall is arranged within each of the first cavity, the second cavity, the third cavity, and the fourth cavity. Each partial support wall extends at least partially from a first sidewall of a respective cavity to a second sidewall of the respective cavity opposite the first sidewall.

In some embodiments, each partial support wall extends entirely from the first sidewall of the respective cavity to the second sidewall of the respective cavity opposite the first sidewall. Each partial support wall includes at least one opening through which fluid passes freely throughout the respective cavity.

In some embodiments, the at least one first passageway includes a first passageway and a second passageway spaced apart from the first passageway in an axial direction. The first airfoil body defines a camber line extending from the leading edge to the trailing edge. Each of the first passageway and the second passageway defines a center extending along a longitudinal extent of the passageway. The center of each of the first passageway and the second passageway intersects with the camber line of the first airfoil body.

A method according to another aspect of the present disclosure includes a first operation of forming an airfoil having a leading edge, a trailing edge opposite the leading edge, a pressure side, and a suction side opposite the pressure side, a second operation of forming a first cavity within the airfoil and forming a second cavity within the airfoil, the second cavity being spaced apart from the first cavity, a third operation of at least partially filling at least one of the first cavity and the second cavity with a damping fluid, a fourth operation of forming at least one passageway extending between and fluidly interconnecting the first cavity and the second cavity, and a fifth operation inducing a modal response in the airfoil such that the damping fluid moves at least partially from one of (i) the first cavity to the second cavity and (ii) the second cavity to the first cavity so as to damp the airfoil and attenuate the modal response.

These and other features of the present disclosure will become more apparent from the following description of the illustrative embodiments.

DETAILED DESCRIPTION OF THE DRAWINGS

Figure 1:
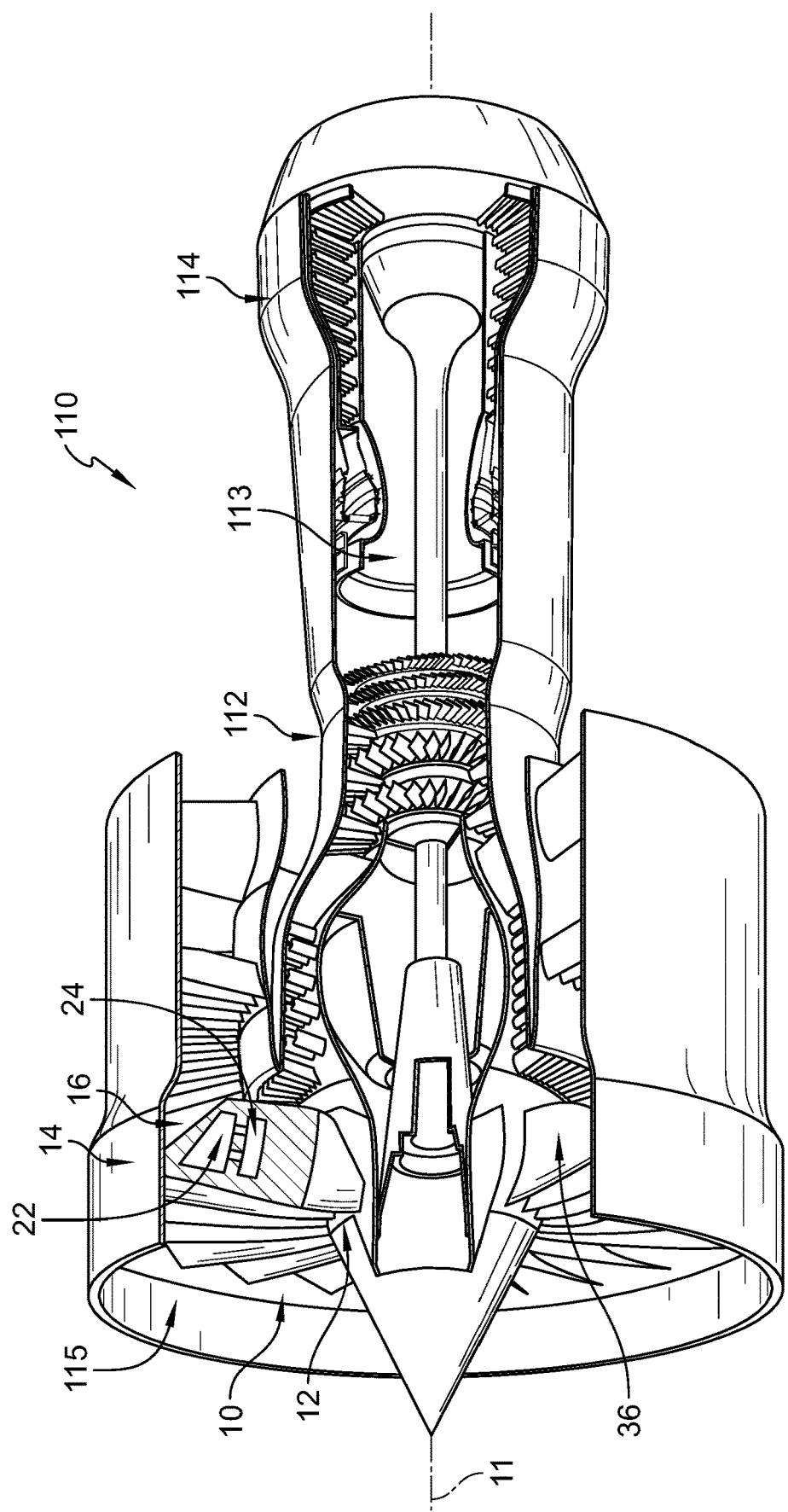
FIG. 1 is a cutaway view of a gas turbine engine that includes a fan, a compressor, a combustor, and a turbine, the fan having a rotor including a wheel arranged around an axis of the engine and a plurality of blades arranged around the wheel that each extend radially outward from the wheel to interact with gases flowing through the engine and suggesting that at least some of the blades include a first cavity and a second cavity formed therein that contain damping fluid configured to move between the cavities via at least one passageway extending between and interconnecting the cavities.

For the purposes of promoting an understanding of the principles of the disclosure, reference will now be made to a number of illustrative embodiments illustrated in the drawings and specific language will be used to describe the same.

A bladed rotor 10 includes a plurality of blades 14 including first blades 16 and second blades 36 as shown in FIG. 1. The bladed rotor 10 is adapted for use in a gas turbine engine 110 that includes a compressor 112, a combustor 113, and a turbine 114, and a fan 115 as shown in FIG. 1. The fan 115 is driven by the turbine 114 and provides thrust for propelling an aircraft. The compressor 112 compresses and delivers air to the combustor 112. The combustor 113 mixes fuel with the compressed air received from the compressor 112 and ignites the fuel. The hot, high pressure products of the combustion reaction in the combustor 113 are directed into the turbine 114 to cause the turbine 114 to rotate about an axis 11 of the gas turbine engine 110 and drive the compressor 113 and the fan 115. In the illustrative embodiment, the fan 115 includes the rotor 10.

The rotor 10 includes a wheel 12 and the plurality of blades 14 as shown in FIG. 1. The wheel 12 is arranged around the axis 11. The blades 16, 36 may each be comprised of a first material and are arranged around the wheel 12. Each blade 16, 36 extends radially outwardly away from the wheel 12 relative to the axis 11 to interact with gases surrounding the rotor 10. The first material is a metallic material in the illustrative embodiment.

Figure 2:
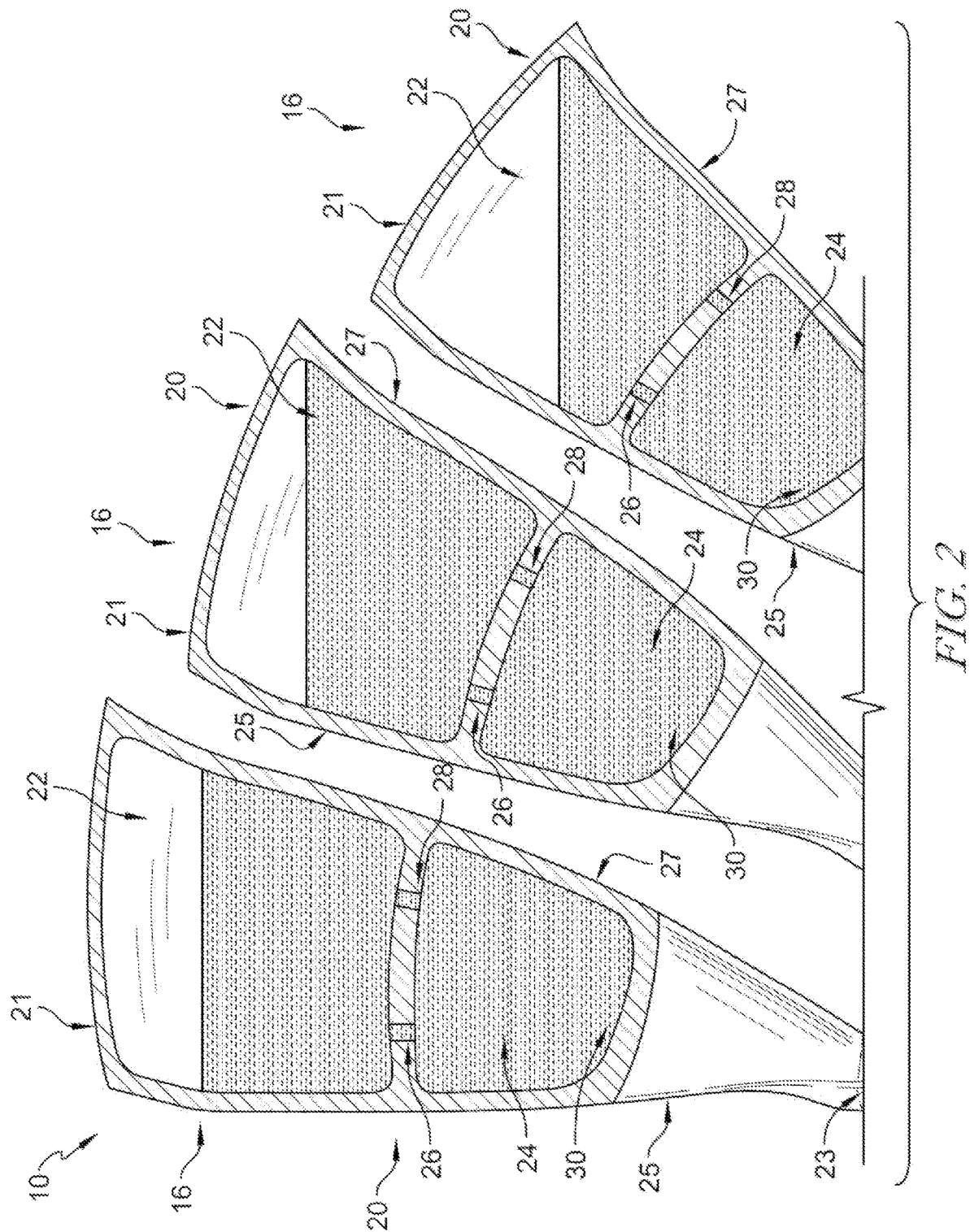
FIG. 2 is a cross-sectional view of a portion of the plurality of blades included in the fan of FIG. 1 showing that each of the illustrated blades is formed to define the first cavity and the second cavity, and further showing a damping fluid disposed within at least one of the first cavity and the second cavity, and showing that the blades further include at least one passageway extending between the cavities and sized to allow the damping fluid to move between the cavities in response to the blades experiencing a modal response so as to damp the blades and attenuate the modal response.
Figure 3:
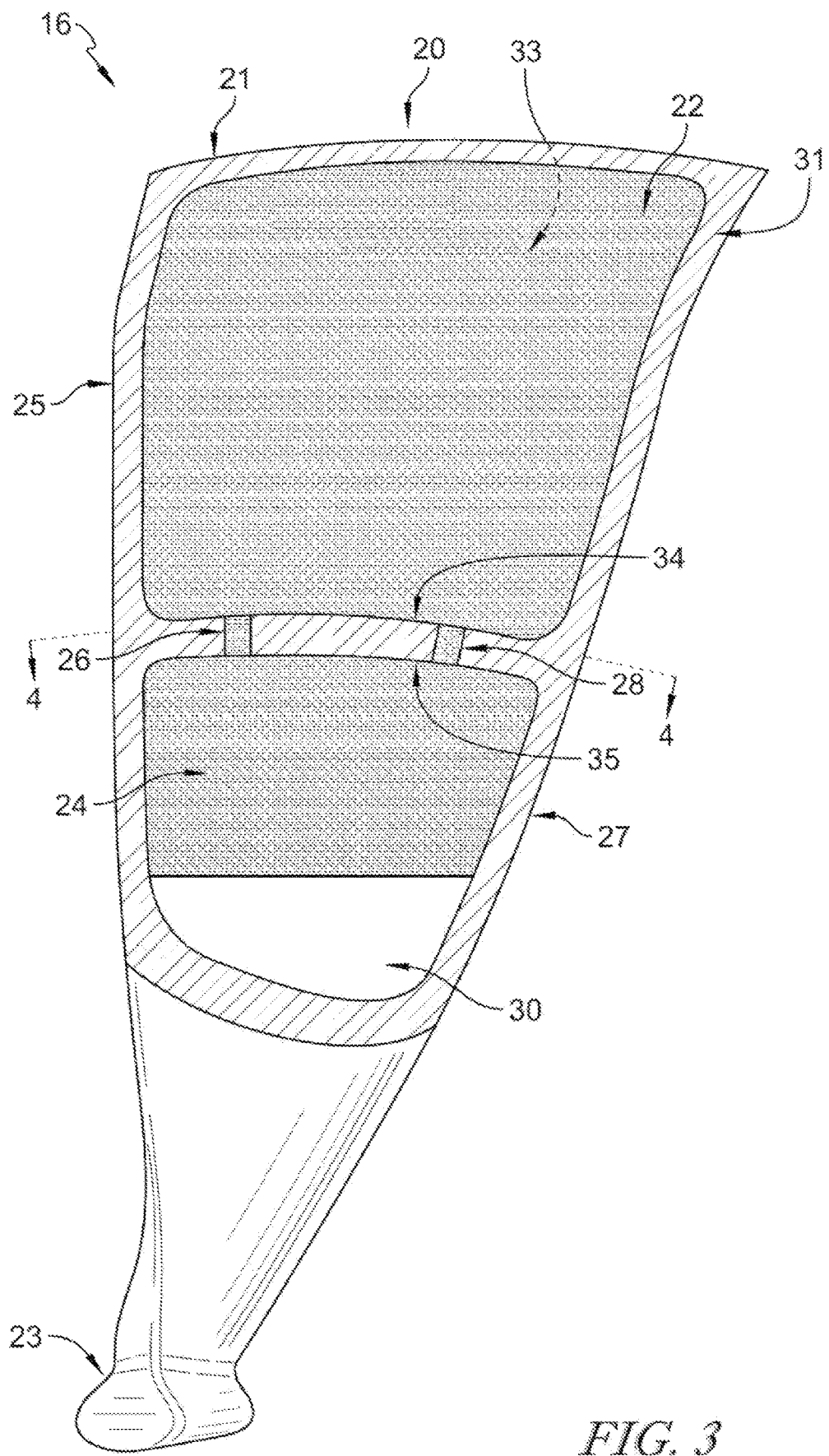
FIG. 3 is a cross-sectional view of one of the blades of FIG. 2 showing that the first cavity is arranged radially outwardly of the second cavity and that the damping fluid is disposed within the second cavity.
Figure 4:
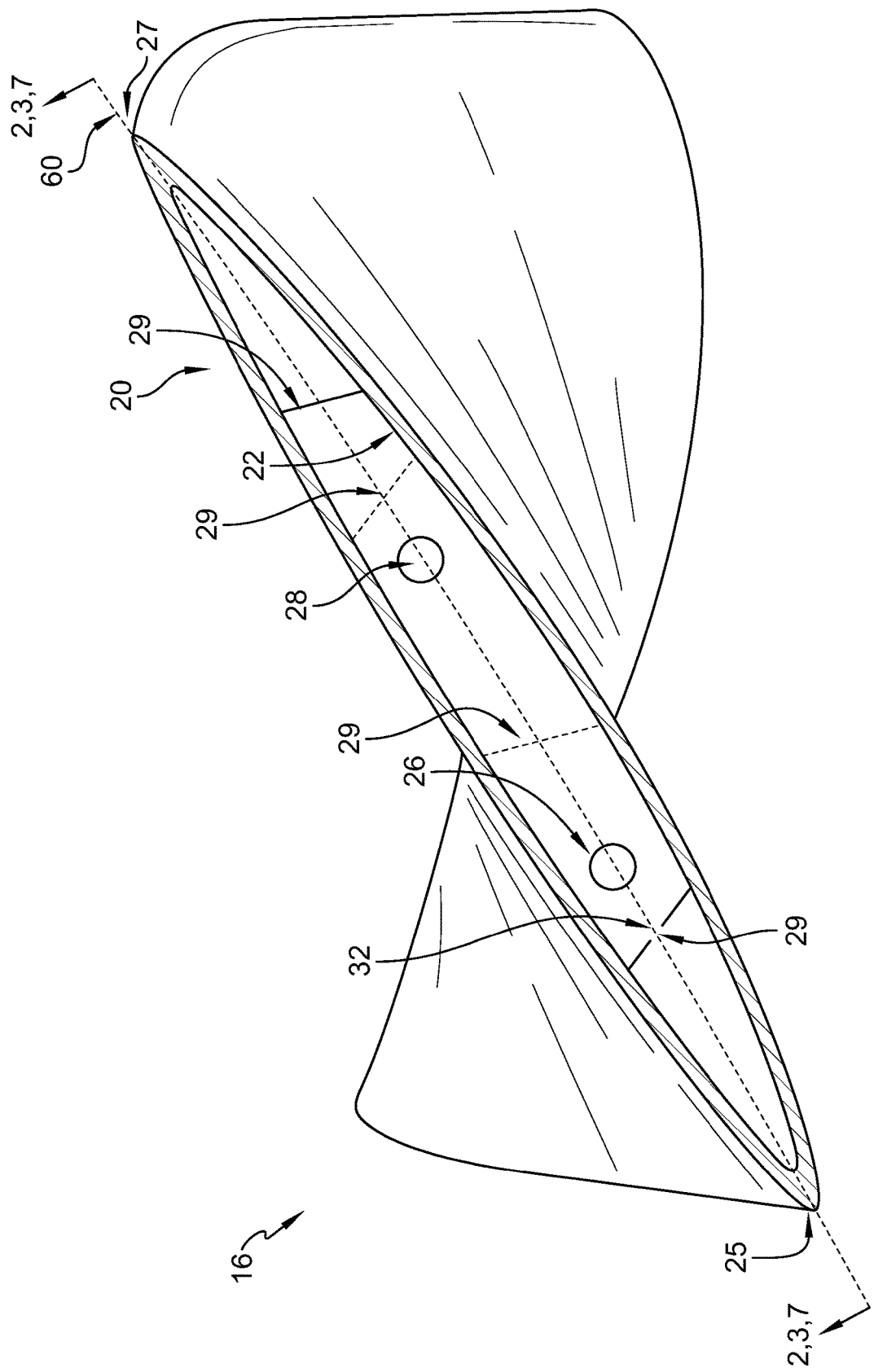
FIG. 4 is a top view of a section of the blade of FIG. 3 showing that the airfoil includes the two passageways that extend radially, and that the airfoil body defines a camber line extending from the leading edge to the trailing edge, and suggesting that a center of each of the first passageway and the second passageway intersects with the camber line of the airfoil body.
Figure 5:
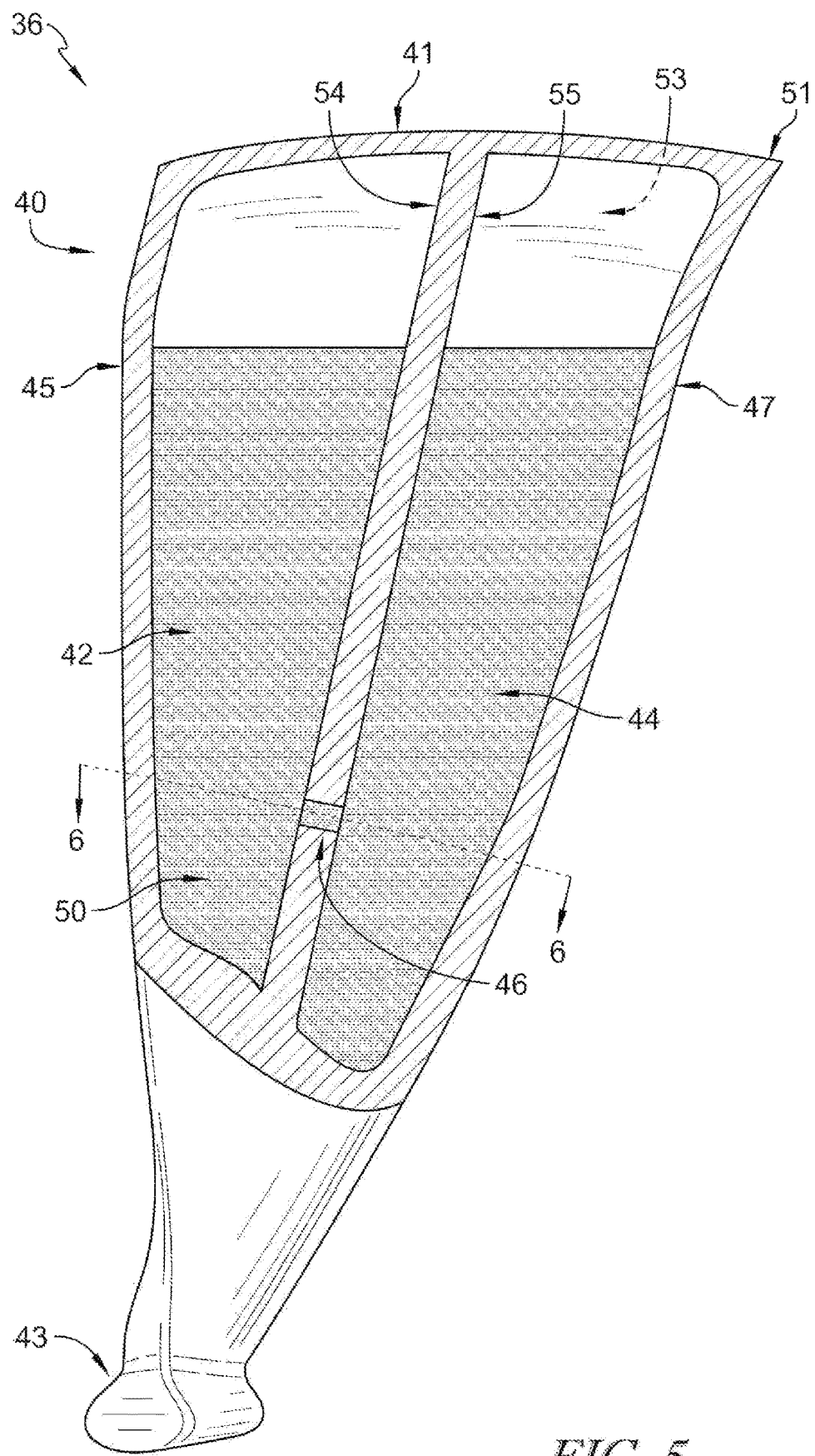
FIG. 5 is a cross-sectional view of another embodiment of a blade included in the fan of FIG. 1 showing that the blade includes a first cavity that is axially spaced apart from a second cavity and that the damping fluid is disposed within the first cavity.
Figure 6:
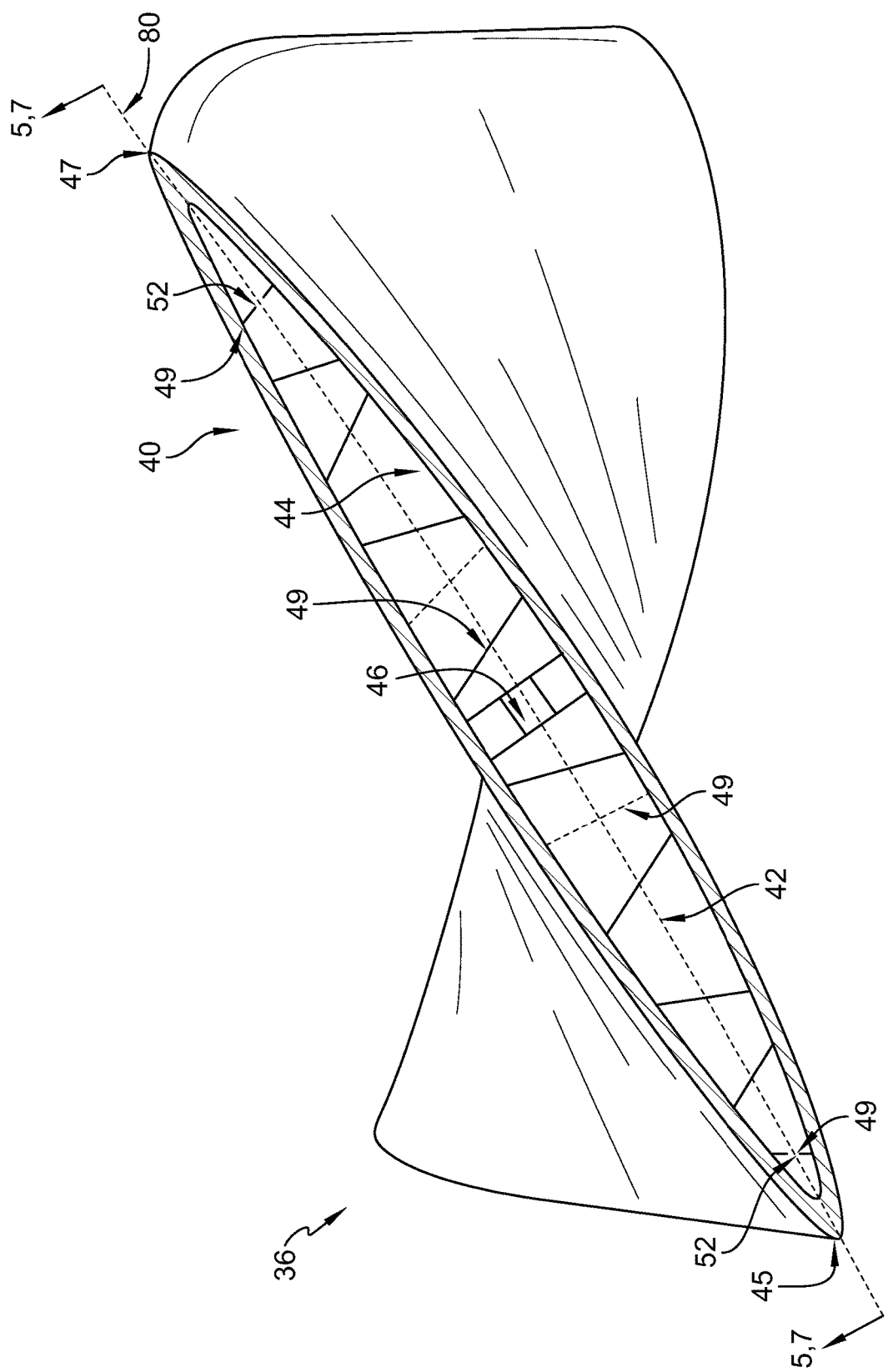
FIG. 6 is a top view of a section of the blade of FIG. 5 showing that the blade includes the passageway that extends axially between the cavities, and that the blade defines a camber line extending from the leading edge to the trailing edge, and suggesting that the center of each of the first passageway and the second passageway is aligned with the camber line of the airfoil body.
Figure 7:
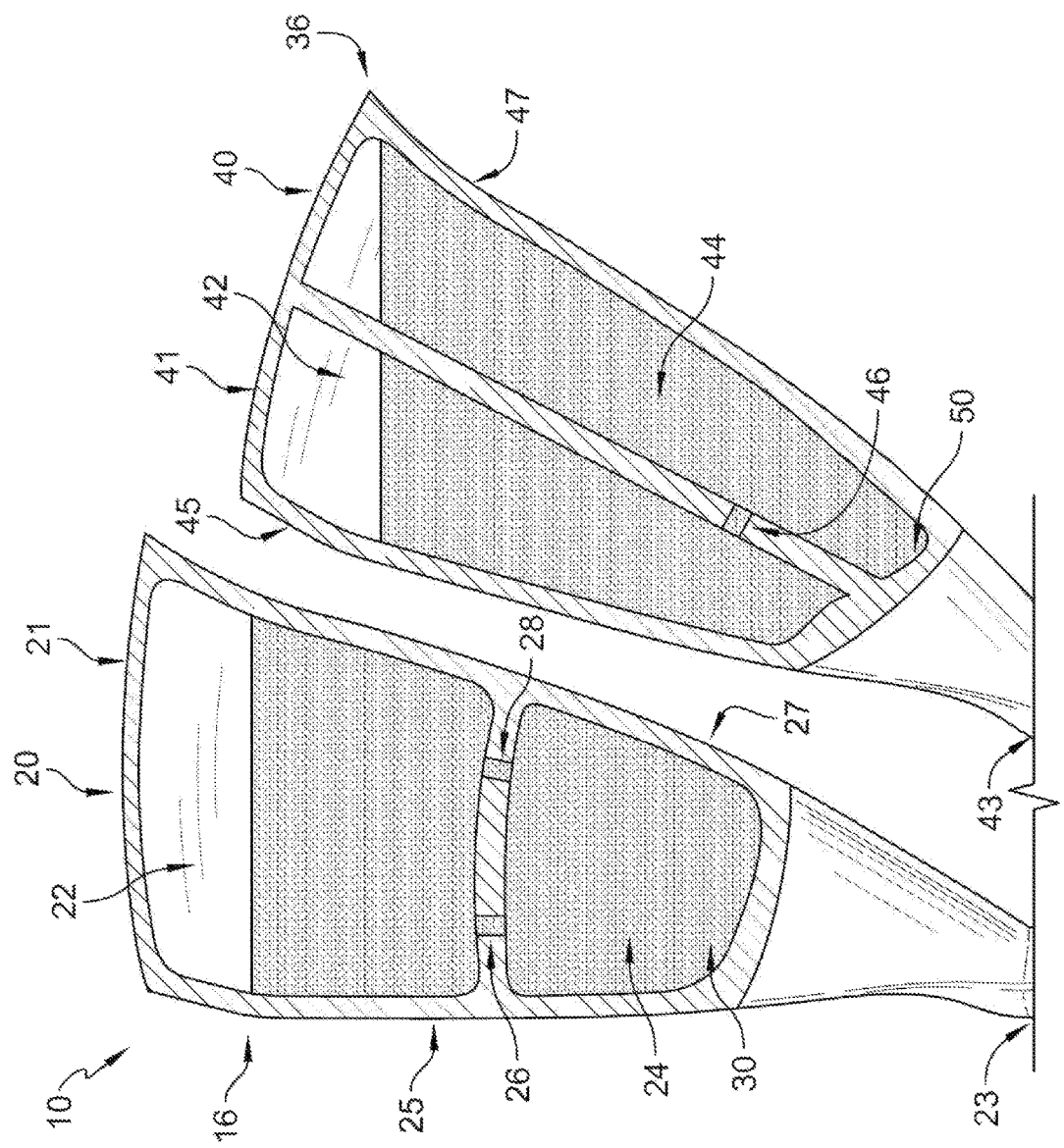
FIG. 7 is a cross-sectional view of a portion of the plurality of blades included in the fan of FIG. 1 including a blade as shown in FIG. 3 and a blade as shown in FIG. 5 arranged circumferentially adjacent the blade of FIG. 3 along the wheel.

The plurality of blades 14 may include at least some the first blades 16, as shown in FIGS. 2-4, and at least some of the second blades 36, as shown in FIGS. 5-7. In some embodiments, the plurality of blades 14 includes only first blades 16, and in some embodiments, the plurality of blades 14 includes only second blades 36. In some embodiments, the plurality of blades 14 may include some of the first blades 16, some of the second blades 36, and any additional numbers of groups of blades described in alternative embodiments of the blades described herein. For example, as shown in FIG. 7, the plurality of blades 14 may include at least one section having a first blade 16 directly adjacent a second blade 36. Each of the first blades 16, the second blades 36, and the alternative blades described herein have external surfaces that are similarly sized and shaped for the particular gas turbine engine 110.

Flutter may be a common aerodynamic phenomenon that may lead to excessive blade vibratory stress and eventual blade failure. Reducing the phenomenon may be difficult when combined with other requirements of the blades 16, 36, such as structural strength and aerodynamic performance. In some instances, mistuning blades may include changing the existing airfoil shape of some of the blades about the rotor. Yet, such arrangements may cause conflicting issues with the other original blades, such as forced response.

In order to attenuate the modal response of the plurality of blades 14, the present disclosure provides for blades having similar external shapes and having at least two cavities 22, 24 formed therein. The cavities include a damping fluid 30 disposed within at least one of the cavities 22, 24. The damping fluid 30 is configured to move between the cavities 22, 24 via at least one passageway 26, 28 to vary the frequency response of the blade. Specifically, when the blade 16, 36 deforms or vibrates, the mode shape motion drives the damping fluid 30 to pass from one cavity to the other cavity. This motion damps the blade 16, 36 and thus attenuates the modal response. The cavities of the illustrative embodiment are partially filled with damping fluid 30. The extent to which the cavities are filled with fluid 30 is dependent on the desired damping effect. The remainder of the cavity space may be filled with air or other gas.

Turning again to the plurality of blades 14, the first blade 16, also referred to as an airfoil, may include an airfoil body 20 as shown in FIGS. 2 and 3. The airfoil body 20 has an aerodynamic shape for accelerating air through the gas turbine engine 110. The airfoil body 20 further includes a blade tip 21 spaced apart radially outward from a blade root 23, the blade root 23 located adjacent to the wheel 12. The airfoil body 20 has a leading edge 25, a trailing edge 27 opposite the leading edge 25, a pressure side external surface 31, and a suction side external surface 33 opposite the pressure side 31 as shown FIGS. 2-4.

In the illustrative embodiment, the blade root 23 of the blade 16 is shaped to be received in a corresponding slot in the wheel 12 to couple the blade 16 to the wheel 12. In some embodiments, the blade root 23 may be another suitable attachment method. In other embodiments, the rotor 10 is a blisk and the plurality of blades 16, 36, as well as the additional arrangements of blades described herein, are integrally formed with the wheel 12.

The blade 16 is formed to include a first cavity 22 within the airfoil body 20 and a second cavity 24 within the airfoil body 20 that is radially spaced apart from the first cavity 22 as shown in FIGS. 2-4. Specifically, the first cavity 22 is located radially outward of the second cavity 24 and adjacent to the blade tip 21. The cavities 22, 24 are formed as hollowed-out spaces within the airfoil body 20. In the illustrative embodiment, the cavities 22, 24 are formed generally centrally relative to the pressure side surface 31, the suction side surface 33, the leading edge 25, and the trailing edge 27. In some embodiments, the airfoil body 20 may include more than two cavities based on the operating conditions that the blades 16 will be experiencing. Moreover, in some embodiments, the cavities 22, 24 may include support walls 29 arranged therein to support the walls of the cavities 22, 24. The cavities 22, 24 are entirely sealed within the airfoil body 20. That is, the cavities 22, 24 are covered entirely by metallic material that forms an external surface of the airfoil body 20.

The blade 16 further includes at least one passageway 26, 28 extending between and fluidly interconnecting the first cavity 22 and the second cavity 24 as shown in FIGS. 2-4. In particular, the at least one passageway 26, 28 includes a first passageway 26 and a second passageway 28 spaced apart from the first passageway 26 in a circumferential direction relative to the wheel 12. The passageways 26, 28 may be formed as hollowed-out cylindrical cavities within the material of the airfoil body 20 or may be hollow tubes that are inserted into the airfoil body 20. The passageways 26, 28 extend in a direction from the blade root 23 to the blade tip 21. In some embodiments, the airfoil body 20 may include more than two passageways 26, 28 or only a single passageway 26 depending on the structural requirements of the blade 16 and the desired rate of fluid flow between the cavities 22, 24. The passageways 26, 28 may be other shapes and may include tapers, angled surfaces, etc.

The airfoil body 20 further includes a damping fluid 30 disposed within at least one of the first cavity 22 and the second cavity 24 as shown in FIGS. 2 and 3. In the illustrative embodiment, the damping fluid 30 is an inert fluid which remains a liquid across a range of temperatures of operation of the blades 14. For example, oils of varying viscosity levels are suitable for this purpose. Oils of different viscosity levels will have differing damping effects on the blade 16, and choosing the appropriate viscosity level of the oil will enhance the damping effect in a given operating condition of the rotor 10 and gas turbine engine 110. However, because oil viscosity may change with temperature, this factor can be taken into account when choosing the appropriate oil for a given operating condition of the gas turbine engine 110. As a further example, the fluid used as the damping fluid 30 may be glycol.

The viscosity of the damping fluid 30 is chosen and the passageways 26, 28 are sized to allow the damping fluid 30 to move at least partially from one of the cavities 22, 24 to another cavity 22, 24 in response to the blade 16 experiencing a modal response during use of the blade 16 so as to damp the blade 16 and attenuate the modal response.

In the illustrative embodiment, the first cavity 22 is spaced apart from the second cavity 24 as shown in FIGS. 2 and 3. Specifically, the first cavity 22 includes a first passageway sidewall 34 through which the passageways 26, 28 open into the first cavity 22. Similarly, the second cavity 24 includes a second passageway sidewall 35 through which the passageways 26, 28 open into the second cavity 24. The first passageway sidewall 34 is spaced apart from the second passageway sidewall 35 such that at least a portion of the material that comprises the airfoil body 20 is disposed between the first passageway sidewall 34 and the second passageway sidewall 35. The cavities 22, 24 are fully enclosed except for the opening in the sidewalls 34, 35 through which the passageways 26, 28 open into the cavities 22, 24.

In some embodiments, the airfoil body 20 defines a camber line 60 extending from the leading edge 25 to the trailing edge 27 as shown in FIG. 4. Each of the first passageway 26 and the second passageway 28 defines a center extending along a longitudinal extent of the passageway 26, 28. The center of each of the first passageway 26 and the second passageway 28 intersects with the camber line 60 of the airfoil body 20. Aligning the center of each passageway 26, 28 with the camber line 60 of the airfoil body 20, and thus generally centrally with each cavity 22, 24, may allow for a maximum amount of damping fluid 30 to move between the cavities 22, 24, increasing the efficiency of the damping.

In some embodiments, the airfoil body 20 further includes at least one partial support wall 29 arranged within the first cavity 22 and at least one partial support wall 29 arranged within the second cavity 24 as shown in FIG. 4. As illustrated, each cavity 22, 24 includes two partial support walls 29, although in other embodiments, the airfoil body 20 may include additional or fewer support walls 29, or no support walls 29, depending on the structural needs of the blade 16.

Each partial support wall 29 extends at least partially from a first sidewall of the cavity 22, 24 to a second sidewall of the cavity 22, 24 opposite the first sidewall so as to provide support for the cavity 22, 24. Because the support walls 29 are formed as partial walls, the damping fluid 30 may flow freely within the cavity 22, 24. In some embodiments, at least one support wall 29 extends entirely from the first sidewall of the cavity 22, 24 to the second sidewall of the cavity 22, 24 and includes at least one opening 32 through which fluid passes freely throughout the respective cavity 22, 24. In some embodiments, every support wall 29 extends entirely from the first sidewall to the second sidewall of the cavity 22, 24 and includes an opening 32.

In some embodiments, the plurality of blades 14 further includes the second blade 36, also referred to as an airfoil, as shown in FIGS. 5-7. The blade 36 is formed similarly to the blade 36, except that the blade 36 includes a different arrangement of cavities 42, 44. The blade 36 includes an airfoil body 40 as shown in FIGS. 5 and 6. The airfoil body 40 has an aerodynamic shape for accelerating air through the gas turbine engine 110. The airfoil body 40 further includes a blade tip 41 spaced apart radially outward from a blade root 43, the blade root 43 located adjacent to the wheel 12. The airfoil body 40 has a leading edge 45, a trailing edge 47 opposite the leading edge 45, a pressure side external surface 51, and a suction side external surface 53 opposite the pressure side 51 as shown FIGS. 5-7.

In the illustrative embodiment, the blade root 43 of the blade 36 is shaped to be received in a corresponding slot in the wheel 12 to couple the blade 36 to the wheel 12. In some embodiments, the blade root 43 may be another suitable attachment method. In other embodiments, the rotor 10 is a blisk, or in other words, having blades integrally machined with the a disk, and the plurality of blades 16, 36, as well as the additional arrangements of blades described herein, are integrally formed with the wheel 12.

The blade 36 is formed to include a first cavity 42 within the airfoil body 40 and a second cavity 44 within the airfoil body 40 that is axially spaced apart from the first cavity 42 as shown in FIGS. 5 and 6. Specifically, the first cavity 42 is located axially spaced apart from the second cavity 44. The cavities 42, 44 are formed as hollowed-out spaces within the airfoil body 40. In the illustrative embodiment, the cavities 42, 44 are formed generally centrally relative to the pressure side surface 51, the suction side surface 53, the leading edge 45, and the trailing edge 47. In some embodiments, the airfoil body 40 may include more than two cavities based on the operating conditions that the blades 36 will be experiencing. Moreover, in some embodiments, the cavities 42, 44 may include support walls 49 arranged therein to support the walls of the cavities 42, 44.

The blade 36 further includes at least one passageway 46 extending between and fluidly interconnecting the first cavity 42 and the second cavity 44 as shown in FIGS. 5 and 6. In the illustrative embodiment, the at least one passageway 46 includes a single first passageway 46. The passageway 46 may be formed as a hollowed-out cylindrical cavity within the material of the airfoil body 40 or may be a hollow tube that are inserted into the airfoil body 40. The passageway 46 extends in a direction from the leading edge 45 to the trailing edge 47. In some embodiments, the airfoil body 40 may include more than one passageway 46 depending on the structural requirements of the blade 36 and the desired rate of fluid flow between the cavities 42, 44.

The airfoil body 40 further includes a damping fluid 50 disposed within at least one of the first cavity 42 and the second cavity 44 as shown in FIGS. 5 and 6. Similar to the blade 16, the damping fluid 50 is an inert fluid which remains a liquid across a range of temperatures. The fluid used as the damping fluid 50 may be an oil or glycol. The viscosity of the damping fluid 50 is chosen and the passageway 46 is sized to allow the damping fluid 50 to move at least partially from one of the cavities 42, 44 to the other cavity 42, 44 in response to the blade 36 experiencing a modal response during use of the blade 36 so as to damp the blade 36 and attenuate the modal response.

In the illustrative embodiment, the first cavity 42 is spaced apart from the second cavity 44 as shown in FIGS. 5 and 6. Specifically, the first cavity 42 includes a first passageway sidewall 54 through which the passageway 46 opens into the first cavity 42. Similarly, the second cavity 44 includes a second passageway sidewall 55 through which the passageway 46 opens into the second cavity 44. The first passageway sidewall 54 is spaced apart from the second passageway sidewall 55 such that at least a portion of the material that comprises the airfoil body 40 is disposed between the first passageway sidewall 54 and the second passageway sidewall 55. The cavities 42, 44 are fully enclosed except for the opening in the sidewalls 54, 55 through which the passageway 46 opens into the cavities 42, 44.

In some embodiments, the airfoil body 40 defines a camber line 80 extending from the leading edge 45 to the trailing edge 47 as shown in FIG. 6. The first passageway 46 defines a center extending along a longitudinal extent of the passageway 46. The center of the first passageway 46 is generally aligned with the camber line 80 of the airfoil body 40. Aligning the center of the passageway 46 with the camber line 80 of the airfoil body 40, and thus generally centrally with each cavity 42, 44, may allow for a maximum amount of damping fluid 50 to move between the cavities 42, 44, increasing the efficiency of the damping.

In some embodiments, the airfoil body 40 further includes at least one partial support wall 49 arranged within the first cavity 42 and at least one partial support wall 49 arranged within the second cavity 44 as shown in FIG. 6. The airfoil body 40 may include multiple support walls 49 in one or both of the cavities 42, 44, a single support wall 49 in one or both of the cavities 42, 44, or no support walls 49, depending on the structural needs of the blade 36.

Each partial support wall 49 extends at least partially from a first sidewall of the cavity 42, 44 to a second sidewall of the cavity 42, 44 opposite the first sidewall so as to provide support for the cavity 42, 44. Because the support walls 49 are formed as partial walls, the damping fluid 50 may flow freely within the cavity 42, 44. In some embodiments, at least one support wall 49 extends entirely from the first sidewall of the cavity 42, 44 to the second sidewall of the cavity 42, 44 and includes at least one opening 52 through which fluid passes freely throughout the respective cavity 42, 44. In some embodiments, every support wall 49 extends entirely from the first sidewall to the second sidewall of the cavity 42, 44 and includes an opening 52.

In operation, the damping fluid 30, 50 is configured to move between the cavities 22, 24, 42, 44 via the at least one passageway 26, 28, 46 to vary the frequency response of the blade. When the blade 16, 36 deforms or vibrates, the mode shape motion drives the damping fluid 30, 50 to pass from one cavity to another cavity. The size of the passageways 26, 28, 46 restricts the flow of the damping fluid 30 such that the rate of fluid transfer at which the damping fluid 30, 50 moves between the first cavity 22 and the second cavity 24 or between the third cavity 42 and the fourth cavity 44 changes a frequency of the modal response of the blade and/or adds damping. Moreover, the damping fluid 30, 50 viscosity is chosen to cause a rate of fluid transfer at which the damping fluid moves between the first cavity and the second cavity to change a frequency of the modal response of the blade and/or add damping. The energy absorbed to move the damping fluid 30, 50 between the cavities 22, 24, 42, 44 aids attenuation of the modal response and to change the frequency of the blade vibration to move it off resonance. Moreover, unsynchronized fluid flow relative to the blade mode frequency contributes to additional damping to attenuate the modal response.

In the illustrative embodiment, the blade 16, which includes the radially spaced apart cavities 22, 24, is arranged in this manner to damp the blade 16 in response to bending of the blade 16 in the spanwise direction. That is, when the blade 16 bends along an axis that extends from the leading edge to the trailing edge, the cavities 22, 24 being radially spaced apart improves the damping effect of the fluid 30. The blade 36, which includes the axially spaced apart cavities 42, 44, is arranged in this manner to damp the blade 36 in response to torsion of the blade 36. That is, when the blade 36 twists along an axis that extends from the blade root to the blade tip, the cavities 42, 44 being axially spaced apart improves the damping effect of the fluid 50. Even further, the cavities 22, 24, 42, 44 may be arranged near a peak displacement for a particular mode or near a peak strain.

In some embodiments, the cavities 22, 24, 42, 44 are located within the blades 16, 36 in locations that accommodate specific deflection, bending, and/or torsion of the blades 16, 36. Specifically, the cavities 22, 24, 42, 44 are located in areas of the blade 16, 36 in which significant deflection, bending, and/or torsion is occurring. For example, the blades 16, 36 described above are beneficial for deflection, bending, and/or torsion occurring in the blade 16, 36 in the general area of the cavities. Other embodiments may include cavities arranged in other areas of the blade, as well be described herein.

In some embodiments, the frequency of the blades 16, 36 in response to various operating conditions of the gas turbine engine 110 may be known prior to manufacturing the cavities such that a desired damping effect may be achieved based on operating conditions that the gas turbine engine 110 will experience.

Figure 8:
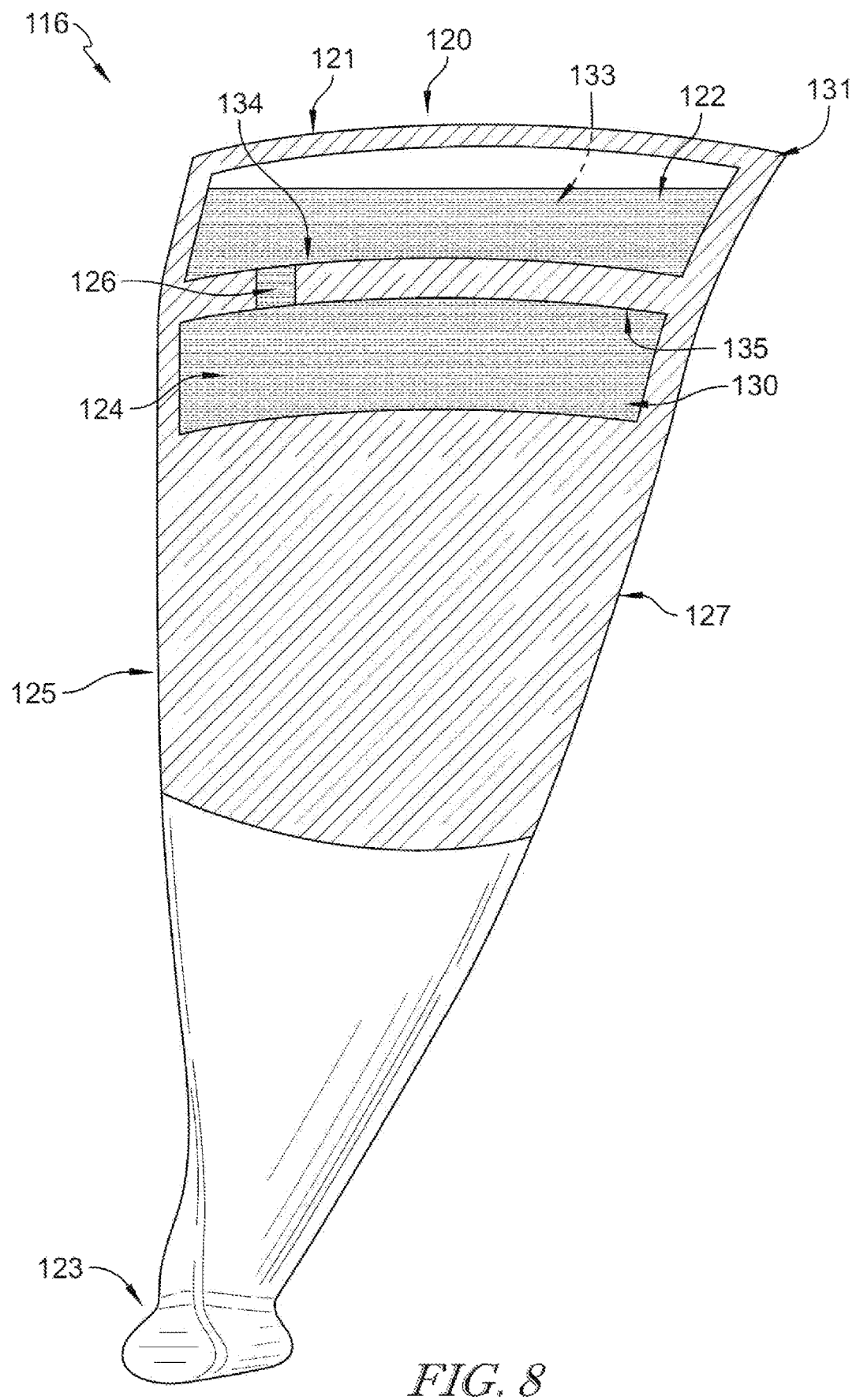
FIG. 8 is a cross-sectional view of a blade according to another aspect of the present disclosure showing that the blade is shaped as an airfoil, the airfoil body formed to define a first cavity within the airfoil body and a second cavity within the airfoil body, the second cavity being spaced apart from the first cavity, and showing that the first cavity and the second cavity are arranged radially outwardly of a halfway point of a radial extent of the airfoil body.

Another embodiment of a blade 116 in accordance with the present disclosure is shown in FIG. 8. The blade 116 is substantially similar to the blade 16, 36 shown in FIGS. 1-7 and described herein. Accordingly, similar reference numbers in the 100 series indicate features that are common between the blade 116 and the blade 16. The description of the blade 16 is incorporated by reference to apply to the blade 116, except in instances when it conflicts with the specific description and the drawings of the blade 116.

The blade 116 includes an airfoil body 120 having an aerodynamic shape for accelerating air through the gas turbine engine 110. The airfoil body 120 further includes a blade tip 121 spaced apart radially outward from a blade root 123, a leading edge 125, and a trailing edge 127 opposite the leading edge 125. The airfoil body 120 further includes a pressure side external surface 131, and a suction side external surface 133 opposite the pressure side 131 as shown FIG. 8.

The blade 116 is formed to include a first cavity 122 within the airfoil body 120 and a second cavity 124 within the airfoil body 120 that is radially spaced apart from the first cavity 122 as shown in FIG. 8. The cavities 122, 124 are formed similar to the cavities 22, 24. Moreover, the blade further includes at least one passageway 126 extending between and fluidly interconnecting the first cavity 122 and the second cavity 124. The airfoil body 120 further includes a damping fluid 130 disposed within at least one of the first cavity 122 and the second cavity 124.

In the illustrative embodiment, the first cavity 122 is spaced apart from the second cavity 124 as shown in FIG. 8. Specifically, the first cavity 122 includes a first passageway sidewall 134 through which the passageway 126 opens into the first cavity 122. Similarly, the second cavity 124 includes a second passageway sidewall 135 through which the passageway 126 opens into the second cavity 124. The first passageway sidewall 134 is spaced apart from the second passageway sidewall 135 such that at least a portion of the material that comprises the airfoil body 120 is disposed between the first passageway sidewall 134 and the second passageway sidewall 135. The cavities 122, 124 are fully enclosed except for the opening in the sidewalls 134, 135 through which the passageway 126 opens into the cavities 122, 124.

The blade 116 differs from the blade 16 at least in that the first cavity 122 and the second cavity 124 are both located on a radially outer side of the blade 116 as shown in FIG. 8. In particular, the first cavity 122 and the second cavity 124 are both arranged radially outwardly of a halfway point of a radial extent of the airfoil body 120. As discussed above, the cavities 122, 124 are located within the blade 116 in locations that accommodate specific deflection, bending, and/or torsion of the blade 116. Thus, arranging both cavities 122, 124 radially outwardly of a halfway point of a radial extent of the airfoil body 120 is beneficial in operating conditions in which the blade 116 is experiencing greater deflection at the radially outer end of the blade 116.

Figure 9:
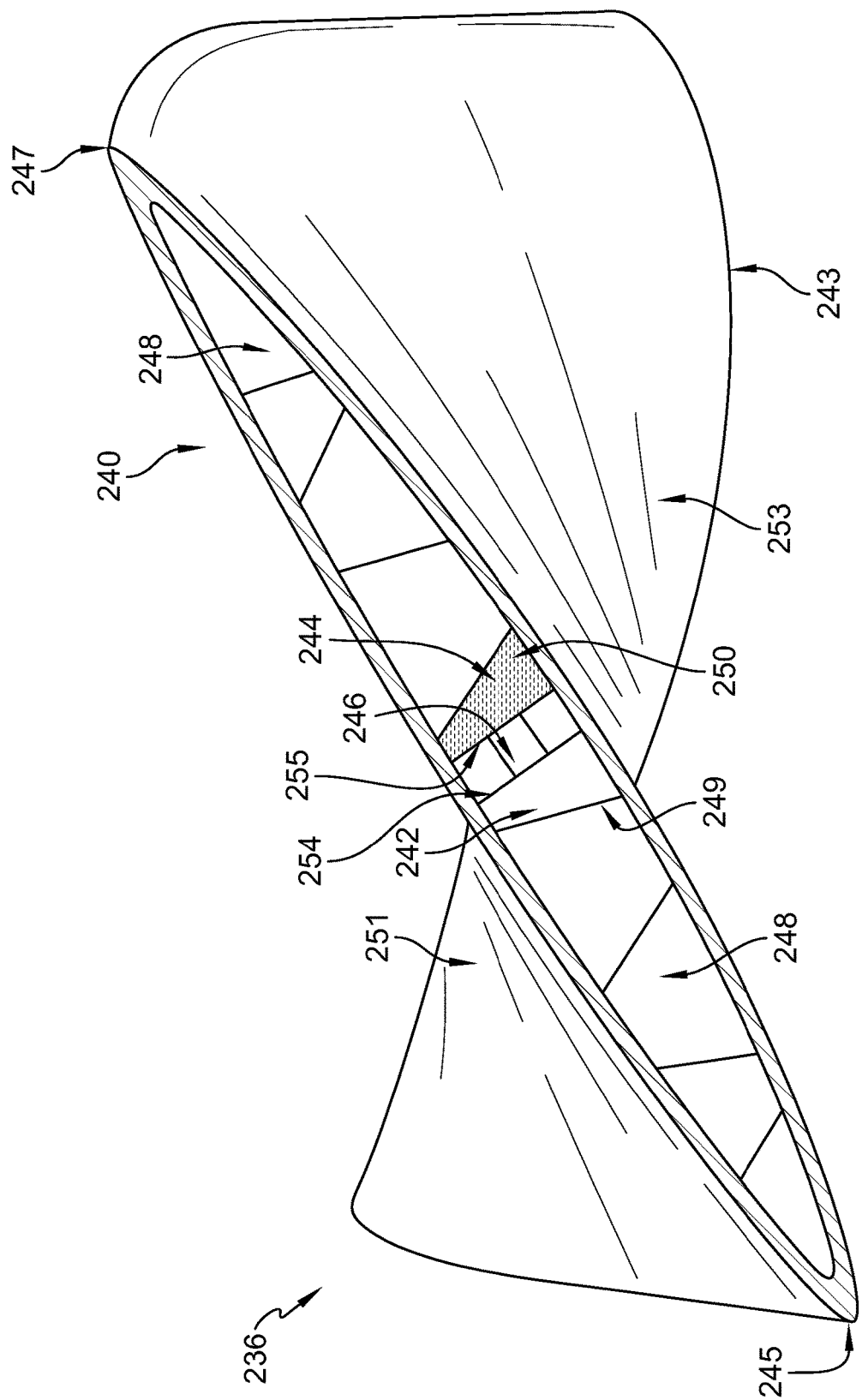
FIG. 9 is a top view of a blade according to another aspect of the present disclosure showing that the airfoil includes a passageway that extends axially between a first cavity and a second cavity, showing that each cavity includes a plurality of support walls extending between the sidewalls of the cavity, showing that the two sidewalls closest to the passageway are entirely solid so as to define smaller cavities within the main cavity, and showing that the damping fluid is contained to only the smaller cavities and may move therebetween.

Another embodiment of a blade 236 in accordance with the present disclosure is shown in FIG. 9. The blade 236 is substantially similar to the blade 36 shown in FIGS. 5-7 and described herein. Accordingly, similar reference numbers in the 200 series indicate features that are common between the blade 236 and the blade 36. The description of the blade 36 is incorporated by reference to apply to the blade 236, except in instances when it conflicts with the specific description and the drawings of the blade 236.

The blade 236 includes an airfoil body 240 having an aerodynamic shape for accelerating air through the gas turbine engine 110. The airfoil body 240 further includes a blade tip (not shown due to cross section) spaced apart radially outward from a blade root 243, a leading edge 245, and a trailing edge 247 opposite the leading edge 245. The airfoil body 240 further includes a pressure side external surface 251, and a suction side external surface 253 opposite the pressure side 251 as shown FIG. 9.

The blade 236 is formed to include a first cavity 242 within the airfoil body 240 and a second cavity 244 within the airfoil body 240 that is radially spaced apart from the first cavity 242 as shown in FIG. 9. The cavities 242, 244 are formed similar to the cavities 42, 44. The cavities 242, 244 differ from the cavities 42, 44 at least in that the cavities 242, 244 are delimited by support walls 249 arranged in the cavity 242, 244. Specifically, the first cavity 242 is delimited by a first passageway sidewall 254 through which the passageway 246 opens into the first cavity 242 and a first support wall 249 that extends entirely between all sides of the cavity 242 to seal off the cavity 242 from the remainder of any open space 248 within the airfoil body 240.

Similarly, the second cavity 244 is delimited by a second passageway sidewall 255 through which the passageway 246 opens into the second cavity 244 and a first support wall 249 that extends entirely between all sides of the cavity 244 to seal off the cavity 244 from the remainder of any open space 248 within the airfoil body 240. As discussed above, the cavities 242, 244 are located within the blade 236 in locations that accommodate specific deflection, bending, and/or torsion of the blade 236. Thus, arranging both cavities 242, 244 near the central radially extending axis of the airfoil body 240 is beneficial in operating conditions in which the blade 236 is experiencing greater deflection around the central radially extending axis of the blade 236.

Figure 10:
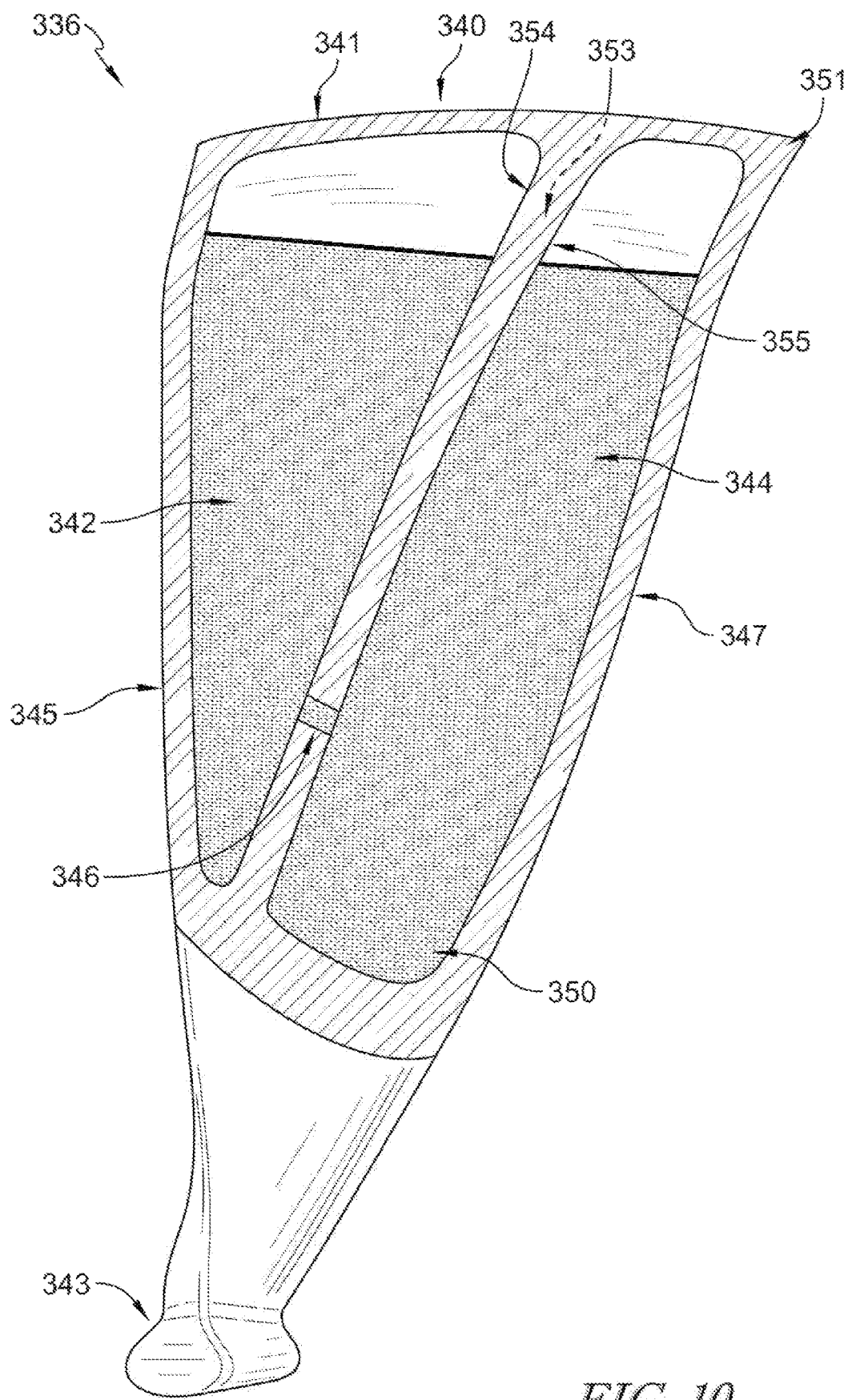
FIG. 10 is a cross-sectional view of a blade according to another aspect of the present disclosure showing that the blade is shaped as an airfoil, the airfoil body formed to define a first cavity within the airfoil body and a second cavity within the airfoil body, the second cavity being spaced apart from the first cavity, and showing that the central walls of each cavity are angled in the same direction so as to be substantially parallel with each other.

Another embodiment of a blade 336 in accordance with the present disclosure is shown in FIG. 10. The blade 336 is substantially similar to the blade 36, 236 shown in FIGS. 1-7 and 9 and described herein. Accordingly, similar reference numbers in the 300 series indicate features that are common between the blade 336 and the blade 36, 236. The description of the blade 36, 236 is incorporated by reference to apply to the blade 336, except in instances when it conflicts with the specific description and the drawings of the blade 336.

The blade 336 includes an airfoil body 340 having an aerodynamic shape for accelerating air through the gas turbine engine 110. The airfoil body 340 further includes a blade tip 341 spaced apart radially outward from a blade root 343, a leading edge 345, and a trailing edge 347 opposite the leading edge 345. The airfoil body 340 further includes a pressure side external surface 351, and a suction side external surface 353 opposite the pressure side 351 as shown FIG. 10.

The blade 336 is formed to include a first cavity 342 within the airfoil body 340 and a second cavity 344 within the airfoil body 340 that is axially spaced apart from the first cavity 342 as shown in FIG. 10. The cavities 342, 344 are formed similar to the cavities 42, 44. Moreover, the blade further includes at least one passageway 346 extending between and fluidly interconnecting the first cavity 342 and the second cavity 344. The airfoil body 340 further includes a damping fluid 350 disposed within at least one of the first cavity 342 and the second cavity 344.

In the illustrative embodiment, the first cavity 342 is spaced apart from the second cavity 344 as shown in FIG. 10. Specifically, the first cavity 342 includes a first passageway sidewall 354 through which the passageway 346 opens into the first cavity 342. Similarly, the second cavity 344 includes a second passageway sidewall 355 through which the passageway 346 opens into the second cavity 344. The first passageway sidewall 354 is spaced apart from the second passageway sidewall 355 such that at least a portion of the material that comprises the airfoil body 340 is disposed between the first passageway sidewall 354 and the second passageway sidewall 355. The cavities 342, 344 are fully enclosed except for the opening in the sidewalls 354, 355 through which the passageway 346 opens into the cavities 342, 344.

The blade 336 differs from the blade 36, 236 at least in that first passageway sidewall 354 and the second passageway sidewall 355 are both angled at the same angle relative to the central radially extending axis of the blade 336 so as to be substantially parallel with each other as shown in FIG. 10. As discussed above, the cavities 342, 344 are located within the blade 336 in locations that accommodate specific deflection, bending, and/or torsion of the blade 336. Thus, arranging the first passageway sidewall 354 and the second passageway sidewall 355 to be angled at the same angle relative to the central radially extending axis of the blade 336 is beneficial in operating conditions in which the blade 336 is experiencing greater deflection along the central radially extending axis of the blade 336.

Figure 11:
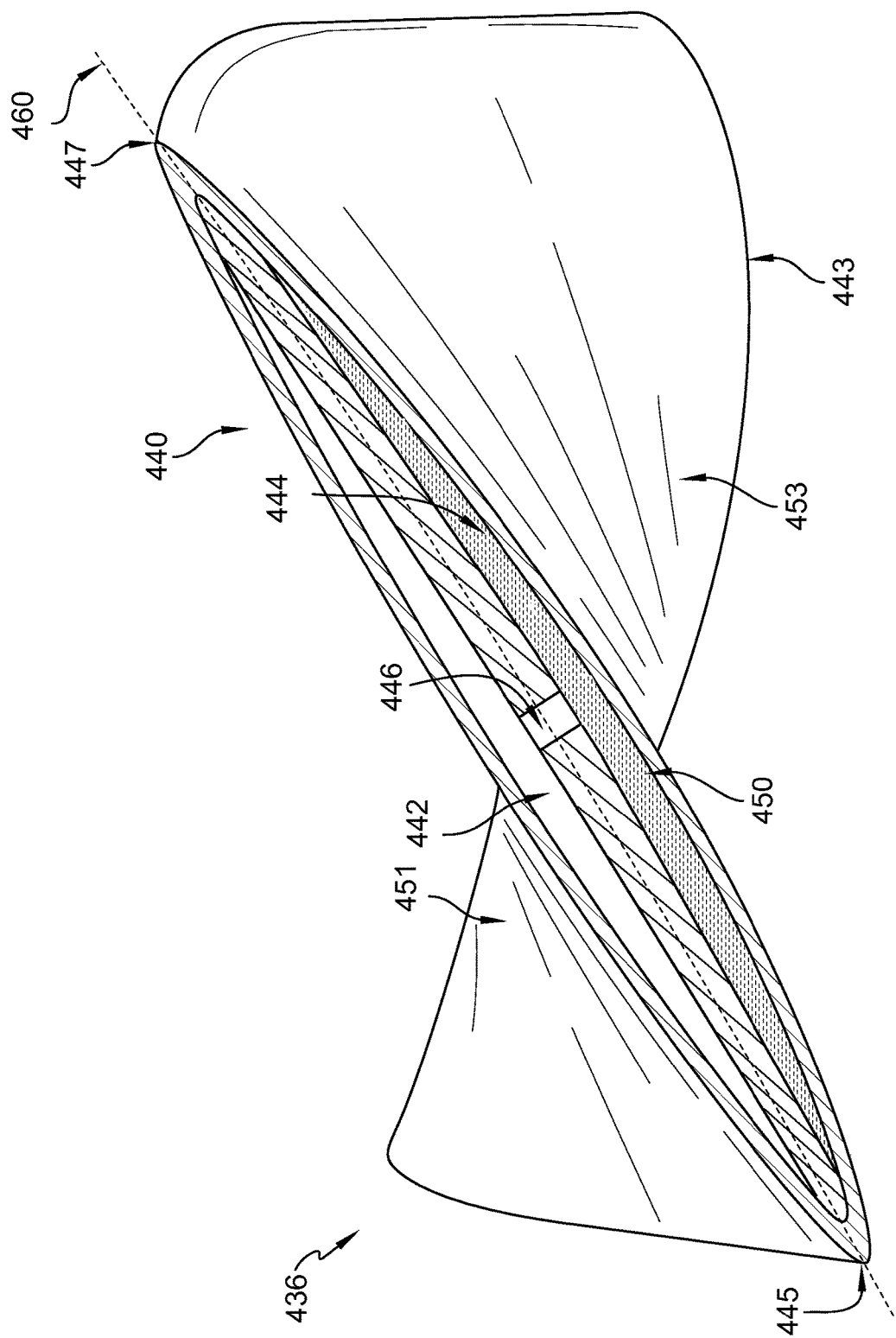
FIG. 11 is a top view of a blade according to another aspect of the present disclosure showing that the airfoil includes a passageway that extends in a direction from a chordwise midpoint of the pressure side of the blade to a chordwise midpoint of the suction side of the blade, and suggesting that a first cavity and a second cavity are arranged on opposing sides of a central camber line of the blade.

Another embodiment of a blade 436 in accordance with the present disclosure is shown in FIG. 11. The blade 436 is substantially similar to the blades 36, 136, 236, 336 described herein. Accordingly, similar reference numbers in the 400 series indicate features that are common between the blade 436 and the blades 36, 136, 236, 336. The description of the blade 36, 136, 236, 336 is incorporated by reference to apply to the blade 436, except in instances when it conflicts with the specific description and the drawings of the blade 436.

The blade 436 includes an airfoil body 440 having an aerodynamic shape for accelerating air through the gas turbine engine 110. The airfoil body 440 further includes a blade tip (not shown due to cross section) spaced apart radially outward from a blade root 443, a leading edge 445, and a trailing edge 447 opposite the leading edge 445. The airfoil body 440 further includes a pressure side external surface 451, and a suction side external surface 453 opposite the pressure side 451 as shown FIG. 11.

The blade 436 is formed to include a first cavity 442 within the airfoil body 440 and a second cavity 444 within the airfoil body 440 that is spaced apart from the first cavity 442 in a direction of the blade thickness as shown in FIG. 11. Specifically, the airfoil body 440 defines a camber line 460 extending from the leading edge 445 to the trailing edge 447. The first cavity 442 and the second cavity 444 are arranged on opposing sides of the camber line 460. The at least one passageway 446 extends between the first cavity 442 and the second cavity 444 so as to intersect the camber line 460. The damping fluid 450 is configured to move between the two cavities 442, 444 similar to the other embodiments described herein.

The cavities 442, 444 are formed similar to the cavities 42, 44. The cavities 442, 444 are configured to be arranged at any location along the span of the blade 436. In some embodiments, the cavities may be positioned at the midspan position or at the tip for midspan or tip bending modes. The cavities 442, 444 may also be tailored for torsion in this way. In some embodiments, the cavities 442, 444 are arranged near the root 443 where there is a larger blade thicknesses available to accommodate the cavities 442, 444. In some embodiments, the cavities 442, 444 are effective even if the cavities are formed in part of the blade, for example in the hub, to produce an effect. As discussed above, the cavities 442, 444 may be located within the blade 436 at any location that accommodates specific deflection, bending, and/or torsion of the blade 436.

A method includes a first operation of forming an airfoil having a leading edge, a trailing edge opposite the leading edge, a pressure side, and a suction side opposite the pressure side. The method further includes a second operation of forming a first cavity within the airfoil and forming a second cavity within the airfoil, the second cavity being spaced apart from the first cavity. The method further includes a third operation of at least partially filling at least one of the first cavity and the second cavity with a damping fluid.

The method further includes a fourth operation of forming at least one passageway extending between and fluidly interconnecting the first cavity and the second cavity. The method further includes a fifth operation of inducing a modal response in the airfoil such that the damping fluid moves at least partially from one of (i) the first cavity to the second cavity and (ii) the second cavity to the first cavity so as to damp the airfoil and attenuate the modal response.

The present disclosure relates to reducing flutter effects induced into blades 16, 36, 136, 236, 336 during operation of the gas turbine engine 110. Flutter is a common aeromechanic phenomenon that may lead to excessive airfoil vibratory stress and eventual airfoil failure. These flutter affects may be difficult to accommodate when combined with other airfoil requirements, and the frequency of the rotor may also be difficult to assess and verify until the overall designs are complete.

To combat the flutter affects, the illustrative embodiments include attenuating modal response of the blades 16, 36, 136, 236, 336 by forming cavities 22, 24, 42, 44, 122, 124, 242, 244, 342, 344 within the blades 16, 36, 136, 236, 336 such that damping fluid 30, 50, 130, 250, 3501 450 disposed within the cavities 22, 24, 42, 44, 122, 124, 242, 244, 342, 344 may flow therebetween. When the blade 16, 36, 136, 236, 336 deforms or vibrates, the mode shape motion drives the damping fluid 30, 50, 130, 250, 3501 450 to pass from one cavity to another cavity. This motion damps the blade 16, 36, 136, 236, 336 and thus attenuates the modal response.

Because the cavities 22, 24, 42, 44, 122, 124, 242, 244, 342, 344 are applied through the blade 16, 36, 136, 236, 336 thickness, the airfoil shape of the blade 16, 36, 136, 236, 336 may be maintained without affecting the aerodynamics of the blade 16, 36, 136, 236, 336. An additional benefit of the present disclosure may include modifying an existing blade to include the described cavities with damping fluid that, when in operation, achieve the desired frequency without affecting the existing aerodynamic airfoil shape of the blades 16, 36, 136, 236, 336. Moreover, the rotor 10 may be designed with a combination of blades 16, 36, 136, 236, 336 that generate mistuned blades and further reduce flutter effects.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected

What is claimed is:

1. An airfoil for use in a gas turbine engine, the airfoil comprising
    an airfoil body extending radially outward relative to an axis and configured to interact with gases surrounding the airfoil body, the airfoil body having a leading edge, a trailing edge opposite the leading edge, a pressure side, and a suction side opposite the pressure side, the airfoil body formed to define a first cavity within the airfoil body and a second cavity within the airfoil body, the second cavity being spaced apart from the first cavity, the airfoil body including a damping fluid disposed within the first cavity and the second cavity, and
    at least one passageway extending between and fluidly interconnecting the first cavity and the second cavity, the at least one passageway sized to allow the damping fluid to move at least partially from one of (i) the first cavity to the second cavity and (ii) the second cavity to the first cavity in response to the airfoil experiencing a modal response so as to damp the airfoil and attenuate the modal response,
    wherein at least one of (i) the at least one passageway is sized such that a rate of fluid transfer at which the damping fluid moves between the first cavity and the second cavity at least one of changes a frequency of the modal response of the airfoil and adds damping and (ii) a damping fluid viscosity causes a rate of fluid transfer at which the damping fluid moves between the first cavity and the second cavity to at least one of change a frequency of the modal response of the airfoil and add damping,
    wherein the first cavity includes a first passageway sidewall through which the at least one passageway opens into the first cavity, wherein the second cavity includes a second passageway sidewall through which the at least one passageway opens into the second cavity, and wherein the first passageway sidewall is spaced apart from the second passageway sidewall such that at least a portion of the airfoil body is disposed between the first passageway sidewall and the second passageway sidewall,
    wherein at least one partial support wall is arranged within the first cavity and at least one partial support wall is arranged within the second cavity, and wherein each partial support wall extends at least partially from a first sidewall of a respective cavity to a second sidewall of the respective cavity opposite the first sidewall, and
    wherein each partial support wall extends entirely from the first sidewall of the respective cavity to the second sidewall of the respective cavity, and wherein each partial support wall includes at least one opening through which fluid is adapted to move throughout the respective cavity.

2. The airfoil of claim 1, wherein the airfoil body includes a blade root located adjacent to a wheel and a blade tip spaced apart radially outward from the blade root, wherein the first cavity is located radially outward of the second cavity and adjacent to the blade tip, and wherein the at least one passageway extends in a direction from the blade root to the blade tip.

3. The airfoil of claim 2, wherein the at least one passageway includes a first passageway and a second passageway spaced apart from the first passageway in an axial direction.

4. The airfoil of claim 3, wherein the airfoil body defines a camber line extending from the leading edge to the trailing edge, wherein each of the first passageway and the second passageway defines a center extending along a longitudinal extent of the passageway, and wherein the center of each of the first passageway and the second passageway intersects with the camber line of the airfoil body.

5. The airfoil of claim 1, wherein the first cavity is located adjacent to the leading edge and the second cavity is located adjacent to the trailing edge such that the first cavity is spaced apart from the second cavity in the direction from the leading edge to the trailing edge.

6. The airfoil of claim 5, wherein the at least one passageway extends in a direction from the leading edge to the trailing edge.

7. The airfoil of claim 1, wherein the first cavity and the second cavity are arranged radially outwardly of a halfway point of a radial extent of the airfoil body.

8. The airfoil of claim 1, wherein the airfoil body defines a camber line extending from the leading edge to the trailing edge, wherein the first cavity and the second cavity are arranged on opposing sides of the camber line, and wherein the at least one passageway extends between the first cavity and the second cavity so as to intersect the camber line.

9. A rotor assembly for use in a gas turbine engine, the rotor assembly comprising
    a wheel arranged circumferentially about an axis, and
    a first airfoil extending radially outwardly from the wheel relative to the axis and configured to interact with gases surrounding the first airfoil, the first airfoil including:

a first airfoil body having a leading edge, a trailing edge opposite the leading edge, a pressure side, and a suction side opposite the pressure side, the first airfoil body formed to define a first cavity within the first airfoil body and a second cavity within the first airfoil body, the second cavity being radially spaced apart from the first cavity, the first airfoil body including a first damping fluid disposed within at least one of the first cavity and the second cavity, and at least one first passageway extending in a radial direction between and fluidly interconnecting the first cavity and the second cavity, the at least one passageway sized to allow the first damping fluid to move at least partially from one of (i) the first cavity to the second cavity and (ii) the second cavity to the first cavity in response to the first airfoil experiencing a modal response so as to damp the first airfoil and attenuate the modal response, wherein the at least one first passageway includes a first passageway and a second passageway spaced apart from the first passageway in an axial direction, wherein a first cross-sectional plane extending in axial and circumferential directions, when viewed from a top perspective of the first airfoil body, intersects the first passageway and the second passageway, wherein the first airfoil body defines a camber line extending from the leading edge to the trailing edge and located in the first cross-sectional plane, wherein each of the first passageway and the second passageway defines a central axis extending along a longitudinal extent of each respective passageway, and wherein the central axis of each of the first passageway and the second passageway intersects with the camber line of the first airfoil body in the first cross-sectional plane.

10. The rotor of claim 9, further comprising:

a second airfoil circumferentially offset from the first airfoil relative to the wheel, the second airfoil extending radially outwardly from the wheel relative to the axis and configured to interact with gases surrounding the second airfoil, the second airfoil including:

a second airfoil body having a leading edge, a trailing edge opposite the leading edge, a pressure side, and a suction side opposite the pressure side, the second airfoil body formed to define a third cavity within the second airfoil body and a fourth cavity within the second airfoil body, the third cavity being axially spaced apart from the third cavity, the second airfoil body including a second damping fluid disposed within at least one of the third cavity and the fourth cavity; and at least one second passageway extending between and fluidly interconnecting the third cavity and the fourth cavity, the at least one second passageway sized to allow the second damping fluid to move at least partially from one of (i) the third cavity to the fourth cavity and (ii) the fourth cavity to the third cavity in response to the second airfoil experiencing a modal response so as to damp the second airfoil and attenuate the modal response.

11. The rotor of claim 10, wherein the first airfoil includes a blade root located adjacent to the wheel and a blade tip spaced apart radially outward from the blade root, wherein the first cavity is located radially outward of the second cavity and adjacent to the blade tip, wherein the at least one first passageway of the first airfoil extends in a direction from the blade root to the blade tip, wherein the third cavity of the second airfoil is located adjacent to the leading edge and the fourth cavity is located adjacent to the trailing edge, and wherein the at least one second passageway of the second airfoil extends in a direction from the leading edge to the trailing edge.

12. The rotor of claim 10, wherein at least one of (i) the at least one passageway is sized such that a rate of fluid transfer at which the damping fluid moves between the first cavity and the second cavity at least one of changes a frequency of the modal response of the first airfoil and adds damping and (ii) a damping fluid viscosity causes a rate of fluid transfer at which the damping fluid moves between the first cavity and the second cavity to at least one of change a frequency of the modal response of the first airfoil and add damping.

13. The rotor of claim 10, wherein at least one partial support wall is arranged within each of the first cavity, the second cavity, the third cavity, and the fourth cavity, and wherein each partial support wall extends at least partially from a first sidewall of a respective cavity to a second sidewall of the respective cavity opposite the first sidewall.

14. The rotor of claim 13, wherein each partial support wall extends entirely from the first sidewall of the respective cavity to the second sidewall of the respective cavity opposite the first sidewall, and wherein each partial support wall includes at least one opening through which fluid passes freely throughout the respective cavity.

15. An airfoil for use in a gas turbine engine, the airfoil comprising an airfoil body extending radially outwardly relative to an axis and configured to interact with gases surrounding the airfoil body, the airfoil body having a leading edge, a trailing edge opposite the leading edge, a pressure side, and a suction side opposite the pressure side, the airfoil body formed to define a first cavity within the airfoil body and a second cavity within the airfoil body, the second cavity being spaced apart from the first cavity, the airfoil body including a damping fluid disposed within the first cavity and the second cavity, and at least one passageway extending between and fluidly interconnecting the first cavity and the second cavity, the at least one passageway sized to allow the damping fluid to move at least partially from one of (i) the first cavity to the second cavity and (ii) the second cavity to the first cavity in response to the airfoil experiencing a modal response so as to damp the airfoil and attenuate the modal response, wherein at least one partial support wall is arranged within the first cavity and at least one partial support wall is arranged within the second cavity, and wherein each partial support wall extends at least partially from a first sidewall of a respective cavity to a second sidewall of the respective cavity opposite the first sidewall, and wherein each partial support wall extends entirely from the first sidewall of the respective cavity to the second sidewall of the respective cavity, and wherein each partial support wall includes at least one opening through which fluid is adapted to move throughout the respective cavity.

* * * * *